United States Patent [19]

Pierson

[11] 4,429,782

[45] Feb. 7, 1984

[54] SCREW CONVEYER WITH REMOVABLE FLIGHTING

[75] Inventor: Gerald R. Pierson, Bloomington, Minn.

[73] Assignee: McQuay-Perfex Inc., Minneapolis, Minn.

[21] Appl. No.: 312,274

[22] Filed: Oct. 16, 1981

[51] Int. Cl.³ ............................................ B65G 33/26
[52] U.S. Cl. .................................................. 198/677
[58] Field of Search ................ 198/660, 662, 676, 677

[56] References Cited

U.S. PATENT DOCUMENTS

| | | |
|---|---|---|
| 525,194 | 8/1894 | Dyson et al. |
| 1,019,438 | 3/1912 | Drummond |
| 1,371,116 | 3/1921 | Quelms |
| 1,443,366 | 10/1922 | Geist |
| 1,775,888 | 9/1930 | Christian |
| 2,138,576 | 11/1938 | Gebert |
| 2,147,878 | 2/1939 | Burmeister |
| 2,556,392 | 6/1951 | Hawk |
| 3,280,963 | 12/1966 | Kirker, Sr. ........................ 198/677 |
| 3,605,995 | 9/1971 | Maack ............................. 198/662 X |
| 3,684,082 | 8/1972 | Wardell ........................... 198/677 X |

Primary Examiner—John J. Love
Attorney, Agent, or Firm—Merchant, Gould, Smith, Edell, Welter & Schmidt

[57] ABSTRACT

An improved screw conveyer with removable flighting includes a rigid helicoid flighting (1) having a passage along its axis defined by the inner edges of the flighting for receiving a shaft (10). The shaft is removably received within the passageway of the flighting, and complementary coupling means associated respectively with the flighting and the shaft cause rotation of the flighting when the shaft is rotated in the first direction, and permit removal of the shaft from the flighting when the shaft is rotated in the opposite direction. In the preferred embodiment, the complementary couplings include a reverse bend (6) in the end of the flighting, and a stop member in the form of a gapped annular washer (12) secured to the shaft. The shaft may be rotated to thread itself into the flighting with the flighting passing through the gap until the reversed bend is encountered, at which point further rotation causes rotation of the flighting. Rotation in the opposite direction resulting unthreading and removal of the shaft.

8 Claims, 5 Drawing Figures

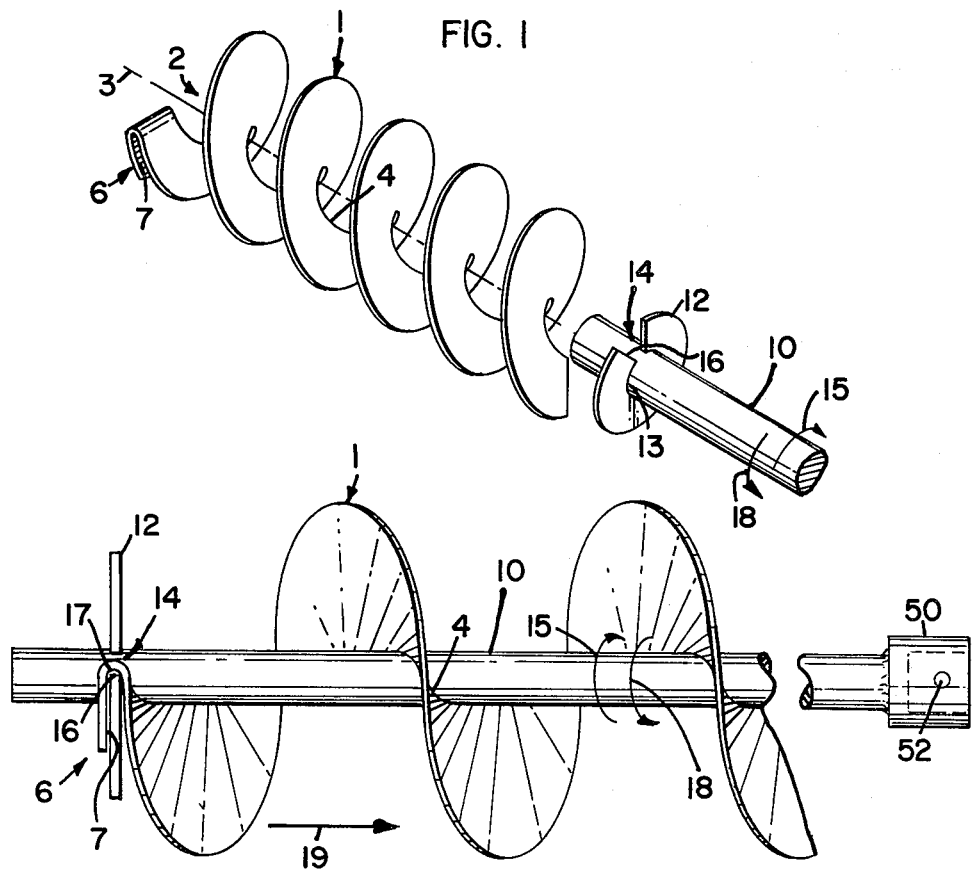
FIG. 1
FIG. 2
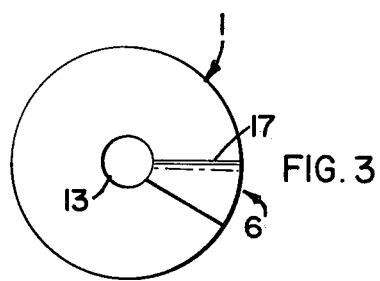
FIG. 3

SCREW CONVEYER WITH REMOVABLE FLIGHTING

FIELD OF THE INVENTION

This invention pertains to the field of screw conveyers, also referred to as augers, and particularly to improvements in screw conveyers having removable flighting.

BACKGROUND OF THE INVENTION

Screw conveyers are used for transporting a wide variety of materials in many diverse industries, including mining, manufacturing, agriculture and food processing. The material to be transported is introduced into a tube or channel containing the screw conveyer, which consists of a helicoid flighting attached for rotation by a driven shaft.

In the case of food handling or processing systems, since the food products are in intimate contact with the flighting and shaft of the conveyer, sanitation and health regulations require that the conveyers be capable of thorough cleaning on a periodic basis, and that disassembly and reassembly operations, if any, that are necessary for cleaning be kept to a minimum in terms of the time, tools and personnel skills required.

Screw conveyers for food handling and processing applications are generally made of stainless steel, with the stainless steel flighting permanently attached to the center drive shaft. The most common method of construction consists of welding the flighting in place along the inner edge thereof where it is in contact with the drive shaft. However, this type of construction is subject to several problems. The welding at the intersection of the flighting and the shaft has a pitted or roughened surface which provides many extremely small recesses in which food product and bacteria can lodge. Cleaning this weld area can be very difficult due to the irregular and small size of the recesses, and their location at the base of the flighting along the helical intersection with the shaft, which makes it somewhat inaccessible for brushing and the like. One solution is to grind and polish the welds to a smooth surface during the manufacturing process, but this is difficult and expensive because of the helical configuration which does not lend itself easily to conventional machining processes. Another solution has been to coat the weld or entire assembly in a protective coating, such as epoxy. However, the coating materials themselves are subject to physical or chemical erosion over a period of time and may chip or peel away creating cleaning problems referred to above.

Another way to avoid the above-mentioned problems associated with the welds is to have the flighting held to the shaft by means other than welding. However, various types of brackets, screws, slots, rivets, etc. may themselves contribute to cleaning problems in terms of small, inaccessible recesses, edges and the like.

Another way to solve the cleaning problems is to make the flighting removable from the shaft to permit access to all parts and surfaces for thorough cleaning. Removable flighting screw conveyers exist in the prior art. However, those prior conveyers generally utilize some types of brackets, slots, or fittings for securing the flighting to the shaft, and in addition to providing sites for harboring food product or bacteria, they may require special tools for training on the part of the operator for disassembly and reassembly. This presents a problem where routine periodic cleaning is essential. The present invention solves these and other problems in the prior art by providing a screw conveyer having removable flighting that may be easily and quickly disassembled, thoroughly cleaned and reassembled.

SUMMARY OF THE INVENTION

The screw conveyer according to the present invention comprises a shaft and a rigid helicoidal flighting member having its inner edge spaced from the axis of the helicoid to form a passageway in which the shaft may be removably positioned. Complementary coupling means operatively associated with the helicoidal flighting and the shaft, respectively, provide engagement of the shaft with the helicoidal flighting when the shaft is inserted and rotated in a first direction, and permit disengagement and extraction of the shaft when rotated in the opposite direction.

According to a preferred form of the invention, the helicoidal flighting member includes a reverse bend in the flighting at one end, and the shaft includes a stop member having a gap for receiving the flighting, so that the shaft can be threaded into the flighting with the flighting passing through the gap until the stop member engages the reverse bend. Continued rotation of the shaft causes rotation of the flighting, and reverse rotation of the shaft causes it to be unthreaded and removed from the flighting.

BRIEF DESCRIPTION OF THE DRAWING

FIG. 1 is a view in perspective of an auger according to this invention with the flighting removed from the shaft;

FIG. 2 is a side view of the auger with the flighting positioned on the shaft;

FIG. 3 is an end view of the flighting of FIG. 1;

DETAILED DESCRIPTION OF THE PREFERRED EMBODIMENT

Figure 4:
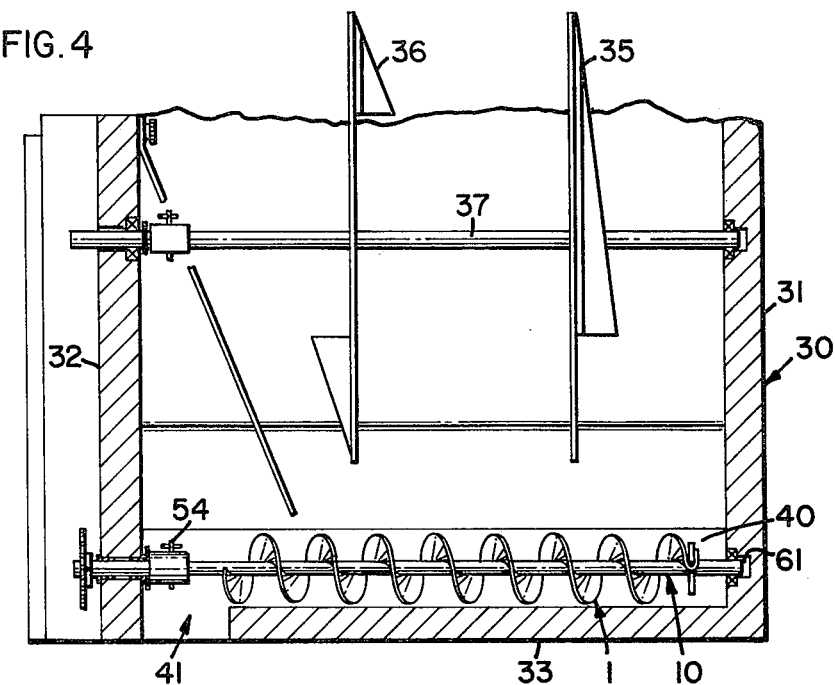
FIG. 4 is a sectional view of an ice bin using the screw conveyer of the present invention.
Figure 5:
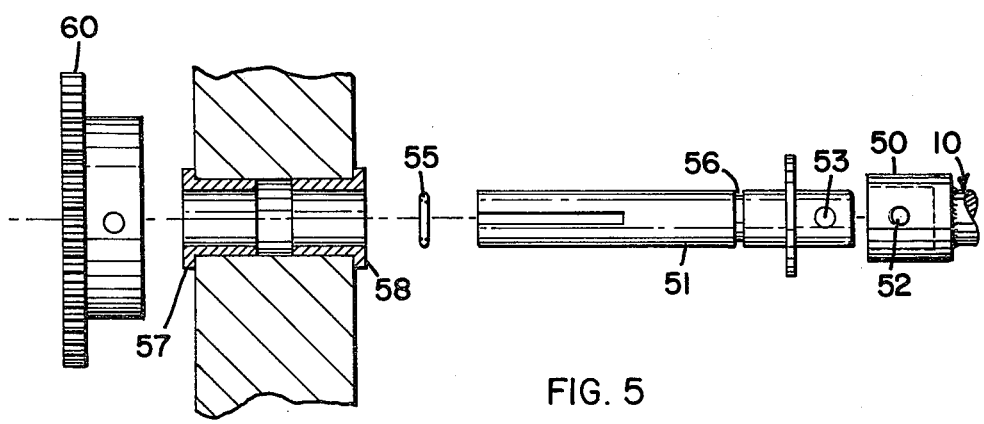
FIG. 5 is an enlarged detail of a portion of FIG. 4, showing the attachment of the shaft of the screw conveyer to the drive means therefor.

Referring to FIG. 1 there is shown a perspective view of an auger with the shaft 10 removed from the flighting 1. Flighting 1 is a rigid helicoidal member having a cylindrical passageway 2 extending along and coinciding with the elongated axis 3 of the helicoid. The passageway 2 is bounded by the inner edge 4 of the flighting. Preferably flighting 1 is constructed of stainless steel having a suitable thickness for maintaining rigidity. At one end the flighting is bent back on itself to form reverse bend 6. A slot-like recess 7 is formed between the adjacent portions of the flighting which are juxtaposed due to the reverse bend.

Shaft 10 is also preferably constructed of stainless steel and is dimensioned for insertion in passageway 2 with the inner edge 4 in contact with the surface of shaft 10 while allowing the shaft to move axially in the passageway 2. A stop member having a gap, which for convenience of manufacture may comprise a washer or gapped annular ring 12, is welded or otherwise firmly affixed to shaft 10 at 13 near one end of the shaft. A gap or notch 14 is provided in washer 12 so as to accomodate the width and the pitch of flighting 1 when the shaft and washer are threaded into the passageway 2.

The operation of the present invention will now be explained. Beginning with the flighting 1 and shaft 10 in relative position as shown in FIG. 1, shaft 10 and washer 12 are threaded into passageway 2 so that the flighting rides within gap 14. With flighting 1 stationary, the shaft 10 is rotated in the direction of arrow 15 threading shaft 10 into passageway 2 until end surface 16 of ring 12 substantially engages surface 17 inside recess 7 formed by reverse bend 6 as illustrated in FIG. 2.

Further rotation of the shaft in the direction indicated by arrow 15 transmits drive force from ring 12 to the flighting 1 resulting in the rotation of the flighting and transportation of product by the conveyor in the direction indicated by arrow 19 when the conveyor is used as part of a product conveying system.

Rotation of the shaft 10 in the direction indicated by arrow 18 results in the disengagement of washer surface 16 and recess surface 17 and the movement of shaft 10 in the direction indicated by arrow 19 with respect to the flighting 1. Sufficient rotations result in the detachment and complete removal of flighting 1 from shaft 10.

Although a reverse bend and a gapped washer are shown as the preferred embodiment, other types of coupling means which permit engagement and removal, respectively, for opposite rotations can be used.

Although the preferred embodiment uses welds for securing the gapped annular washer 12 and sleeve 50 to the shaft, these welds are not as extensive as the wells for the flighting in the prior art, and may be easily ground and polished smooth with conventional machining techniques, as they involve only annular, rather than helical, paths along the shaft.

An example of an application for the screw conveyer of the present invention is shown in FIG. 4. FIG. 4 shows a portion of an ice bin for an ice dispensing apparatus. The bin, indicated by reference number 30, includes insulated sidewalls 31 and 32 and insulated bottom 33. The upper portion of bin 30 is broken away, but typically bin 30 might be used in conjunction with an ice cube or flake making apparatus which would be positioned above the bin, and which would discharge cubes as they are made into bin 30 for storage. Stirring devices 35 and 36 are attached to shaft 37 positioned in the bin. A suitable drive mechanism (not shown) rotates shaft 37 to stir the ice and keep it from freezing into large masses.

A trough 40 is provided at the bottom of the bin, and the screw conveyer, consisting of flighting 1 and shaft 10, according to the present invention, is placed in trough 40. A discharge opening 41 is provided in the bottom 33 of the bin at one end of trough 40.

Shaft 10 of the screw conveyer has a sleeve 50 attached at the end thereof opposite from washer 12. Sleeve 50 has a recess for receiving the end of a drive shaft 51. Sleeve 50 and drive shaft 51 have matching holes 52, 53, respectively, through which a quick release pin 54 can be inserted to couple the drive shaft to the shaft of the auger. Drive shaft 51 fits through bearings 57, 58 in wall 32, and includes an "O"-ring 55 which fits in an annular channel 56. At the other end of drive shaft 51 outside of bin 30, a drive gear 60 is attached by means of a set screw (not shown). Alternatively, some other type of drive means could be provided.

When the screw conveyer is in place in the trough, the end of shaft 10 extending beyond washer 12 fits in a recess 61 bin wall 31, which serves as the bearing for that end of the auger.

In use, as gear 60 is driven, shaft 10 is driven to cause rotation of flighting 1 to convey ice to discharge opening 41.

To remove the auger for cleaning, quick release pin 54 is first removed. Shaft 10 is then moved in a direction toward bin wall 31 to remove sleeve 50 from drive shaft 51. The end of shaft 10 which includes sleeve is then moved upwardly, pulling the other end of the shaft out of bearing recess 61, and the entire auger assembly can be removed through the top of the bin. The stirring device would preferrably also be removable for cleaning, and preferably includes a similar coupling to permit easy removal.

After the auger assembly has been removed, rotation of the shaft with respect to the flighting in the manner described previously will unthread the shaft to permit cleaning of both parts. Reassembly and reinstallation are accomplished by a reverse of the above steps.

It will thus be seen that this invention provides an improved screw conveyer in which the flighting is quickly and easily removable from the shaft, for example to permit cleaning. The improved screw conveyer is particularly useful for conveying food products because it eliminates cleaning problems associated with welding of the flighting to the shaft in the prior art.

What is claimed is:

1. A screw conveyor comprising:
   a rigid helicoidal member having a coaxial cylinder passageway;
   a shaft sized to fit in said passageway;
   complementary coupling means operatively associated with said helicoidal member and said shaft respectively and including a reverse bend on one end of said helicoidal member, said coupling means for engaging said shaft member and said member upon inserting said shaft in said member and rotating said shaft in one direction, and for disengaging and permitting extraction of said shaft from said member upon rotating said shaft in the other direction.

2. A screw conveyor according to claim 1 wherein said coupling means associated with said shaft comprises a stop member having a gap for receiving the helicoidal member to permit threading said shaft into said passageway, the edge of the stop member adjacent the gap for engaging the reverse bend for driving the helicoidal member.

3. A screw conveyor comprising:
   a rigid member forming a helical flighting extending along and around a elongated axis, the inner edge of said flighting spaced from said axis to form a cylindrical passageway;
   a shaft sized to fit in said passageway;
   a first coupling means comprising a reverse bend in one end of said flighting member;
   a second coupling means integral with said shaft for cooperating with said first coupling means to engage said shaft and said flighting when said shaft is rotated in one direction and to disengage said shaft from said flighting for removal of said shaft from said flighting when rotated in the other direction.

4. A screw conveyor according to claim 3 wherein said second coupling means comprises a stop member having a gap for receiving the flighting to permit threading said shaft into said passageway, the edge of the stop member adjacent the gap for engaging the reverse bend for driving the flighting.

5. A removable shaft screw conveyor comprising:
a rigid helicoidal member having a coaxial cylindrical passageway;
a shaft sized to fit in said passageway;
first coupling means comprising a reverse bend in one end of said helicoidal member and second coupling means integral with said shaft for coupling said shaft and said member when said shaft is inserted in said member and rotated in one direction, and for decoupling to permit extraction of said shaft from said member when said shaft is rotated in other direction.

6. A screw conveyor according to claim 5 wherein said coupling means integral with said shaft comprises a gapped annular washer fixed to and encircling said shaft, said gap for receiving the helicoidal member to permit threading said shaft into said passageway, the edge of the washer adjacent the gap for engaging the reverse bend for driving the helicoidal member.

7. A removable shaft screw conveyor comprising:
a rigid helical flighting forming an internal passageway;
a shaft sized to fit in said passageway;
a first coupling means comprising a reverse bend in one end of said flighting;
a second coupling means connected to said shaft for transmitting drive force from said shaft to said flighting when said shaft is inserted in said member and rotated in one direction, and for permitting removal of said shaft from said flighting when said shaft is rotated in the other direction.

8. A screw conveyor according to claim 7 wherein said second coupling means comprises a gapped annular washer affixed to and encircling said shaft, said gap for receiving the flighting to permit threading said shaft into said passageway, the edge of the washer adjacent the gap for engaging the reverse bend for driving the flighting.

* * * * *